US007533156B1

(12) United States Patent
Jeyaraman et al.

(10) Patent No.: US 7,533,156 B1
(45) Date of Patent: May 12, 2009

(54) METHOD AND APPARATUS FOR RMI-IIOP IMPLEMENTATION WITH JAVA SERIALIZATION

(75) Inventors: Thulasiraman Jeyaraman, San Jose, CA (US); Harold Carr, Salt Lake City, UT (US); Ken M. Cavanaugh, Montara, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 693 days.

(21) Appl. No.: 11/117,267

(22) Filed: Apr. 28, 2005

(51) Int. Cl.
*G06F 15/16* (2006.01)
*G06F 3/00* (2006.01)
(52) U.S. Cl. .................................. 709/218; 719/330
(58) Field of Classification Search ................ 709/218; 719/330
See application file for complete search history.

(56) References Cited

U.S. PATENT DOCUMENTS

| 6,173,327 | B1 | 1/2001 | De Borst et al. |
|---|---|---|---|
| 6,272,557 | B1 | 8/2001 | Lim et al. |
| 6,282,581 | B1 | 8/2001 | Moore et al. |
| 6,351,749 | B1 | 2/2002 | Brown et al. |
| 6,418,422 | B1 | 7/2002 | Guenther et al. |
| 6,446,137 | B1 | 9/2002 | Vasudevan et al. |
| 6,817,009 | B2 | 11/2004 | Flanagan et al. |
| 6,820,261 | B1 | 11/2004 | Bloch |
| 7,028,312 | B1 | 4/2006 | Merrick et al. |
| 7,089,567 | B2 | 8/2006 | Girardot et al. |
| 7,139,811 | B2 | 11/2006 | Lev Ran et al. |
| 2002/0116454 | A1 | 8/2002 | Dyla et al. |
| 2002/0120428 | A1 | 8/2002 | Christiaens |
| 2003/0149741 | A1 | 8/2003 | Krooss |
| 2003/0172110 | A1 | 9/2003 | Kunisetty |
| 2003/0204586 | A1 | 10/2003 | Schnetzler |
| 2004/0158589 | A1 | 8/2004 | Liang et al. |
| 2004/0267933 | A1 | 12/2004 | Przybylski et al. |
| 2007/0150546 | A1 | 6/2007 | Karakashian et al. |

OTHER PUBLICATIONS

France Telecom R&D, "The Hello World example using the David RMI/IIOP implementation", Apr. 12, 2002.*
France Telecom R&D, "Jonathan 3.0 Documentation: Class JavaSerialService", Apr. 12, 2002.*
Gokhale, Aniruddha and Schimidt, Douglas. "Optimizing a CORBA Internet Inter-ORB Protocol (IIOP) Engine for Minimal Footprint Embedded Multimedia Systems". IEEE Journal on Selected Areas in Communications, vol. 17, No. 9, Sep. 1999.*

(Continued)

*Primary Examiner*—Larry D Donaghue
*Assistant Examiner*—Bryan Lee
(74) *Attorney, Agent, or Firm*—Robert C. Kowert; Meyertons, Hood, Kivlin, Kowert & Goetzel, P.C.

(57) ABSTRACT

Method and apparatus for RMI-IIOP implementation using Java serialization as a data encoding mechanism. Embodiments may provide a mechanism to use Java serialization rather than, or as an alternative to, CORBA Common Data Representation (CDR), for the marshaling and unmarshaling of data in RMI-IIOP message exchanges. In one embodiment, a server-side Object Request Broker (ORB) may be configured to support the encoding of data in RMI-IIOP messages in accordance with CDR encoding and Java serialization encoding. A client-side ORB may optionally use Java serialization or CDR as the data encoding format for RMI-IIOP messages to invoke the associated object on the server. Response messages from the server to the client may include data encoded according to Java serialization or CDR.

30 Claims, 8 Drawing Sheets

OTHER PUBLICATIONS

France Telecom R&D, "Jonathan: a white paper", Apr. 12, 2002.*
France Telecom R&D, "Jonathan 3.0 Documentation", Apr. 12, 2002.*
France Telecom R&D, "Jonathan 3.0 Documentation: Class IIOPORBFactory", Apr. 12, 2002.*
Java™ To IDL Language Mapping Specification, Version 1.3, Sep. 2003; Object Management Group; http://www.omg.org/docs/formal/03-09-04.pdf.
U.S. Appl. No. 10/954,861, filed Sep. 30, 2004.
U.S. Appl. No. 11/117,023, filed Apr. 28, 2005.
Domani, et al., "Thread-Local Heaps for Java", IMA Haifa Research Laboratory, Mount Carmel, ACM 2002, pp. 76-87.
Roberto Chinnici, Java TM API for XML-based RPC JAX-RPC 1.1—JSR-101 Java Community Proces (JCP), Sun Microsystems, Apr. 11, 2003, (166 pages).
Douglas C. Schmidt, "The Adaptive Communication Environment—An Object Oriented Network Programming Toolkit for Developing Communication Software," http//:www.cs.wustl.edu/~schmidt/, Department of Computer Science, (25 pages).
Bill Venners, "Jini Extensible Remote Invocation—A Conversation with Bob Scheifler, Part VI," Artima Developer, Aug. 12, 2002, (7 pages).

* cited by examiner

METHOD AND APPARATUS FOR RMI-IIOP IMPLEMENTATION WITH JAVA SERIALIZATION

BACKGROUND OF THE INVENTION

1. Field of the Invention

This invention relates to network computing, and more particularly to serialization mechanisms for data transmitted between clients and servers in RMI-IIOP implementations.

2. Description of the Related Art

RMI

RMI (Remote Method Invocation) is a way that a programmer, using the Java programming language and development environment, can write object-oriented programs in which objects on different computers can interact in a distributed network. RMI is the Java version of what is generally known as a remote procedure call (RPC), but with the ability to pass one or more objects along with the request. The object can include information that will change the service that is performed in the remote computer. The object parameter-passing mechanism may be referred to as object serialization. An RMI request is a request to invoke the method of a remote object. The request has the same syntax as a request to invoke an object method in the same (local) computer. In general, RMI is designed to preserve the object model and its advantages across a network.

RMI may be implemented as three layers:

- A stub (proxy) program in the client side of the client/server relationship, and a corresponding skeleton at the server end. The stub appears to the calling program to be the program being called for a service.
- A Remote Reference Layer that can behave differently depending on the parameters passed by the calling program. For example, this layer can determine whether the request is to call a single remote service or multiple remote programs as in a multicast.
- A Transport Connection Layer, which sets up and manages the request.

A single request travels down through the layers on one computer and up through the layers at the other end.

CORBA, IIOP, and ORB

IIOP (Internet Inter-ORB Protocol) is a protocol that makes it possible for distributed programs written in different programming languages to communicate over the Internet. IIOP is a critical part of an industry standard, the Common Object Request Broker Architecture (CORBA). CORBA is an architecture and specification for creating, distributing, and managing distributed program objects in a network. CORBA allows programs at different locations and developed by different vendors to communicate in a network through a broker that mediates remote requests.

An essential concept in CORBA is the Object Request Broker (ORB). An Object Request Broker (ORB) acts as a "broker" between a client request for a service from a distributed object or component and the completion of that request. ORB support in a network of clients and servers on different computers means that a client program (which may itself be an object) can request services from a server program or object without having to understand where the server is in a distributed network or what the interface to the server program looks like. Using ORBs, components can find out about each other and exchange interface information as they are running. To make requests or return replies between the ORBs, programs may use the General Inter-ORB Protocol (GIOP) and, for TCP/IP, Internet Inter-ORB Protocol (IIOP). IIOP maps GIOP requests and replies to the Internet's Transmission Control Protocol (TCP) layer in each computer CORBA and IIOP assume the client/server model of computing in which a client program makes requests and a server program waits to receive requests from clients. When writing a program, an interface is used called the General Inter-ORB Protocol (GIOP). The GIOP is implemented in specialized mappings for one or more network transport layers. An important specialized mapping of GIOP is IIOP, which passes requests or receives replies through the Internet's transport layer using the Transmission Control Protocol (TCP). Other possible transport layers may include, but are not limited to, IBM's Systems Network Architecture (SNA) and Novell's IPX.

RMI-IIOP

When a client communicates with a server using the IIOP protocol to access RMI objects on the server, the communication process may be referred to as RMI-IIOP because calls from the client target RMI objects on the server, and access to the RMI objects on the server is enabled through an IIOP mechanism.

Java Interface Definition Language (IDL) adds CORBA capability to the Java platform, providing standards-based interoperability and connectivity. Java IDL enables distributed Web-enabled Java applications to transparently invoke operations on remote network services using the industry standard OMG IDL (Object Management Group Interface Definition Language) and IIOP. Java IDL technology may be used by CORBA programmers who want to program in the Java programming language based on interfaces defined in CORBA Interface Definition Language (IDL). This is "business as usual" CORBA programming, supporting Java technology in a similar way as other languages such as C++ or COBOL.

Interoperable Object Reference (IOR)

Remote references are used by clients to invoke remote operations on servers. In CORBA, a remote reference to an object on a server may be referred to as an Interoperable Object Reference (IOR). An IOR is a network-addressable (remote) reference as defined by CORBA. In RMI-IIOP, an IOR may be encapsulated in a Java object referred to as an RMI-IIOP stub.

Common Data Representation (CDR)

Client and server programs may deal with data that must be marshaled into a standard form before it can be passed in messages. The standard form (or external data representation) supports both data structures and primitive data items. CORBA encodes messages in a binary format called CDR (Common Data Representation). CORBA CDR is designed for use by a variety of programming languages. CDR is a transfer syntax that maps Interface Definition Language (IDL) types from their native host format into a common binary representation. CDR-encoded messages may be used to transmit CORBA requests and server responses across a network. All IDL data types are marshaled using the CDR syntax into a stream that contains the marshaled data.

FIG. 1 is a block diagram illustrating a conventional RMI-IIOP implementation. RMI-IIOP implementations generally follow CORBA guidelines, specifications, and requirements. There are essentially two parts to RMI-IIOP: protocol and encoding. Following the CORBA guidelines, RMI-IIOP conventionally uses General Inter-ORB Protocol (GIOP), according to the CORBA specification, for the protocol, and CDR (Common Data Representation) for encoding.

In FIG. 1, a CORBA client 110 is shown using RMI-IIOP through client-side ORB 112 and server-side ORB 102 on server 100 to access object(s) 106 on the server 100. Server 100 may be an application server instance on a server system; a server system may include one or more instances of an application server. Note that client 110 may itself be a server or an application on another or the same server. Objects 106 may reside in one or more containers 104 on server 100. A container 104 is an entity that provides life cycle management, security, deployment, and runtime services to objects 106. An object 106 may be defined as an application-level software unit supported by a container 104. J2EE objects may include development and deployment units in the EJB tier and Web tier. Objects 106 may include one or more of, but are not limited to, EJBs (Enterprise JavaBeans), JSPs (JavaServer Pages) and Servlets. Containers 104 provide support for the objects 106, providing for reliable and standardized object-specific services. Various types of containers (e.g., EJB, Web, JSP (JavaServer Pages), Servlet, applet, and application client) may provide object-specific services.

Client 110 may desire or need to invoke an object 106 on server 100. To invoke an object, client 110 needs information about the object 106, such as where the object 106 is located. To obtain this information, client 110 may access a naming registry, for example a CORBA naming service, to obtain an object reference (IOR 120) for the object 106. An IOR 120 may include information for accessing the associated object 106. For example, an IOR 120 may include one or more of, but is not limited to, the host name, port name, and Quality of Service (QoS) information.

After obtaining an IOR 120, the client 110 may make an invocation on the target object 106 on the server 100. When client 110 makes an invocation of an object 106 on the server 100, the client-side ORB 112 constructs a message 132 formatted in accordance with GIOP that may then be sent to the server 100 via RMI-IIOP. There are different types of messages 132 supported the GIOP protocol. The type of message 132 used is appropriate to the nature of the particular call being made. For invocation of an object 106, a request message may be used. Messages 132 may be constructed by the client-side ORB 112. To construct a message 132, data 114 appropriate to the message 132 may be marshaled into one or more message buffers. For example, a target object 106 to be invoked which is a method "FOO( )" may require one or more parameters, which may be of integer, Boolean, string, real, or any other data type. The parameters from the client side are marshaled into the message buffers so that they can be sent "over the wire" to the server 100 in a message 132. Conventionally, RMI-IIOP implementations use CDR, a data encoding format from the CORBA specification, as the encoding for data marshaled into messages 132. The messages 132 may then be sent "over the wire" to the server 100, where the server-side ORB 102 may unmarshal the CDR-encoded data from the messages into a data format used by the object 106 being invoked on server 100, which may or may not be the same data format used on client 110. Note that the invoked object 106 on server 100 may generate one or more response messages to client 110. In sending response messages, server-side ORB 102 may marshal data formatted in accordance with a data format used by the invoked object 106 into CDR. Client-side ORB 112 may unmarshal the CDR-encoded data from received response messages into a data format used on client 110.

Java Serialization

The Java platform allows the creation of reusable objects in memory. However, the objects exist only as long as the Java virtual machine remains running. Object serialization is the process of saving an object's state to a sequence of bytes, as well as the process of rebuilding those bytes into an object. The Java Serialization API, which is part of the Java Developer's Kit (JDK), provides a standard mechanism for the serialization of Java objects. Serialization involves saving the current state of an object to a stream, and restoring an equivalent object from that stream. The stream functions as a "container" for the object. The stream's contents include a partial representation of the object's internal structure, including variable types, names, and values. The stream, or container, may be transient (RAM-based) or persistent (disk-based). A transient stream, or container, may be used to prepare an object for transmission from one computer to another. A persistent stream, or container, such as a file on disk, allows storage of the object after the current session is finished. In both cases, the information stored in the stream may later be used to construct an equivalent object containing the same data as the original.

SUMMARY

Embodiments of a method and apparatus for RMI-IIOP implementation using Java serialization as a data encoding mechanism are described. Embodiments may provide an RMI-IIOP implementation that may use Java Serialization rather than, or in addition to, CDR, to marshal data into RMI-IIOP messages formatted in accordance with General Inter-ORB Protocol (GIOP) for RMI-IIOP message exchanges. Some embodiments may provide a mechanism to dynamically determine or select which of two or more encoding types (e.g., CORBA CDR (Common Data Representation) and Java serialization) to use in RMI-IIOP message exchanges. Embodiments may provide a mechanism or mechanisms to change the encoding of RMI-IIOP messages while keeping the message protocol (GIOP) the same. While embodiments are generally discussed herein as using Java serialization as an alternative to CDR for marshaling/unmarshaling data in RMI-IIOP messages, some embodiments may support other encoding types for marshaling/unmarshaling data in RMI-IIOP messages.

In one embodiment, an Interoperable Object References (IOR) may include information that indicates which encoding types are supported by the server-side Object Request Broker (ORB) on the server that hosts the object associated with the IOR. In one embodiment, the IOR may include a tagged component that may be used to indicate which Java encoding type(s), if any, are supported by the server-side ORB, and the version of the Java encoding type(s) supported. Other embodiments may use other mechanisms than a tagged component in the IOR to indicate which encoding types, and which versions of encoding types, are supported. If the IOR indicates that Java serialization is supported, in one embodiment the client-side ORB may optionally use Java serialization or CDR as the encoding format for RMI-IIOP messages to invoke the associated object on the server via the server-side ORB. By using the tagged component to indicate which encoding types are supported by the server-side ORB, both Java serialization and CDR encoding may be supported, and other encodings than Java serialization and CDR may also be supported, while remaining compatible with other versions.

In embodiments, if both the client-side ORB and server-side ORB support Java serialization, the client may communicate with the server using either Java serialization or CDR for the encoding of data in RMI-IIOP messages. The client-side ORB may switch from one encoding type to the other from one RMI-IIOP message to the next, if desired. A client may use Java serialization for the encoding of data in RMI-IIOP messages to communicate with one server-side ORB that supports Java serialization for data encoding in RMI-IIOP messages, and CDR to communicate with another server-side ORB that does not support Java serialization for data encoding in RMI-IIOP messages. A server may use Java serialization for the encoding of data in RMI-IIOP messages to communicate with one client, and CDR to communicate with another client.

In one embodiment, a server may publish an IOR for an object hosted on the server. The IOR may be published, for example, through a naming registry, for example a CORBA naming service. The IOR may indicate, for example in a tagged component, that the server supports both CDR encoding and Java serialization encoding for data in RMI-IIOP message exchanges, and may also indicate the type and version of Java encoding supported. A client may obtain the IOR and, if the client supports Java serialization, the client may optionally marshal data into RMI-IIOP request message(s) in accordance with Java serialization encoding. In one embodiment, GIOP version information in the request message may be used to indicate that Java serialization (or CDR) is used to encode the data, and to indicate the type and version of Java encoding, if used. The message(s) may then be sent to the server to invoke the object.

The server may receive an RMI-IIOP request message to invoke the object. The server may determine the encoding type (e.g., Java serialization or CDR) used to marshal data into the message from the GIOP version information in the RMI-IIOP request message. The server may then unmarshal the data from the message in accordance with the indicated encoding type and invoke the object. In one embodiment, in sending RMI-IIOP response messages, if any, to the client, the server may marshal data into the response messages using Java serialization if the client supports Java serialization or, alternatively, CDR. In one embodiment, GIOP version information in the response message may be used to indicate the encoding type (and version) used. The client, after receiving the RMI-IIOP response messages, may unmarshal the data from the response messages in accordance with the particular encoding type used for the data in the response message(s).

Figure 1:
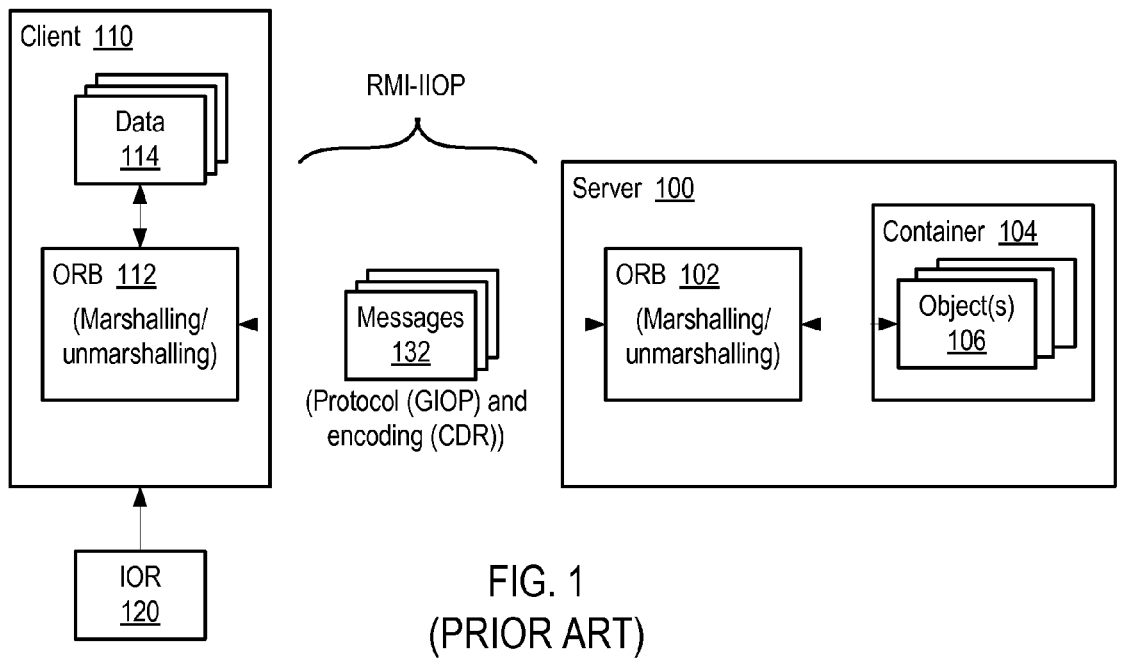
FIG. 1 is a block diagram illustrating a conventional RMI-IIOP implementation using CORBA Common Data Representation (CDR) data encoding.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of a method and apparatus for RMI-IIOP implementation using Java serialization as a data encoding mechanism are described. Embodiments may provide an RMI-IIOP implementation that may use Java Serialization rather than, or in addition to, CDR, to marshal data into RMI-IIOP messages formatted in accordance with General Inter-ORB Protocol (GIOP) for RMI-IIOP message exchanges. Using Java serialization with RMI-IIOP may improve communication performance by using more efficient data encodings than conventional RMI-IIOP implementations. Some embodiments may provide a mechanism to dynamically determine or select which of two or more encodings (e.g., CORBA CDR (Common Data Representation) and Java serialization) to use in message exchanges between objects using RMI-IIOP.

Embodiments may provide mechanisms to change the encoding of RMI-IIOP messages while keeping the message protocol (GIOP) the same. Embodiments may provide the same message types that are part of the standard GIOP protocol, but the details of how data in the messages are encoded are different. Note that, while embodiments are generally discussed herein as using Java serialization as an alternative to CDR for marshaling/unmarshaling data in RMI-IIOP messages, some embodiments may support other encoding mechanisms for marshaling/unmarshaling data in RMI-IIOP messages.

In one embodiment, Interoperable Object References (IORs) may include information that indicates which encoding types are supported by server-side Object Request Brokers (ORBs). In one embodiment, this information may be used to indicate which encoding types are supported, in particular if Java serialization is supported. In one embodiment, each IOR may include a tagged component that may, for example, include information describing the Java encoding type, if present, and may indicate the version of the Java encoding type used. If the IOR indicates that Java serialization is supported, the client-side ORB may optionally use either Java serialization or CDR as the encoding format for RMI-IIOP messages to invoke the associated object on the server via the server-side ORB. In one embodiment, GIOP version information in the RMI-IIOP messages may be used to indicate which type (and version) of encoding is used in the messages. By using the tagged component in the IOR and the GIOP version information in the messages to indicate which encoding types are supported by the server-side ORB and which encoding type is used in particular messages, both Java serialization and CDR encoding may be supported, and other encodings than Java serialization and CDR may also be supported while remaining backwards-compatible with older versions.

In embodiments, if both the client-side ORB and server-side ORB support Java serialization, the client may communicate with the server using either Java serialization or CDR for encoding of data in RMI-IIOP messages. The client-side ORB may switch from one encoding type to the other from one RMI-IIOP message to the next, if desired, indicating which encoding type is used in a particular message in the GIOP version information. A client may use Java serialization for the encoding of data in RMI-IIOP messages to communicate with one server-side ORB that supports Java serialization for data encoding in RMI-IIOP messages, and CDR to communicate with another server-side ORB that does not support Java serialization for data encoding in RMI-IIOP messages. A server may use Java serialization for the encoding of data in RMI-IIOP messages to communicate with one client, and CDR to communicate with another client. In one embodiment, there may be an object reference (IOR) in a server-side ORB that is simultaneously communicating with two different clients via RMI-IIOP using Java serialization and CDR, respectively.

As mentioned above, serialization involves saving the current state of an object to a stream from which an equivalent object may be restored. Some serialized streams may include headers. One embodiment may support streams with headers, and streams that do not contain a header. For streams with a header, Java serialization encoding may be used in conjunction with "no-encoding". No-encoding is an unspecified encoding. That is, even though Java serialization encoding is used to serialize values on to the message buffer, at least part of the stream's header may be constructed without using Java serialization encoding. Thus, for a single message, both Java serialization encoding and no-encoding may be used. For streams with no header, only Java serialization encoding may be used.

A stream generated by Java serialization may include nested streams. A top-level stream that has a header may include one or more nested, headerless streams. One embodiment may be able to distinguish between the top-level stream with header and the nested, headerless streams.

One embodiment may support implicit Stub creation activation. For example, a java.rmi.Remote type may be contained within a serializable object. During marshaling, the Stub for the remote type needs to be marshaled instead of the object itself. Similarly, while unmarshaling, the Stub needs to be connected to a servant object. The Java serialization mechanism as described herein may support this functionality by trapping into the Java serialization API.

One embodiment of the Java serialization mechanism may implement a byte array output stream that grows the logical buffer into which data is being marshaled incrementally without buffer copying. This is an alternative to the java.io.ByteArrayOutputStream class implementation, and is more efficient since it avoids the buffer copy overhead of java.io.ByteArrayOutputStream, which doubles the buffer size each time the buffer capacity is exceeded during marshalling, resulting in unnecessary buffer copy overhead. Using java.io.ByteArrayOutputStream, each time the buffer size is doubled, the old buffer contents are copied over to the newly allocated larger buffer. For example, if the initial size of the buffer is 1024 bytes, and the total data content written out is 5000 bytes, there will be three buffer copies. That is, (1) 1024→2048, (2) 2048→4096, and (3) 4096→8192, totaling (1):1024+(2):2048+(3):4096=7168 bytes.

This embodiment of the of the Java serialization mechanism avoids the buffer copy overhead by using a list of variable size byte arrays. The number of byte arrays in the list grows over time, starting with one, depending on how much data is written out to the stream. For example, if 5000 bytes are written out, the list will eventually contain three byte arrays (1024, 2048, and 4096). The last byte array will contain 1928 bytes of data, with the rest empty.

One embodiment may support mark and reset operations on the input stream, even though the Java serialization API does not support these operations. Support for mark and reset operations may be required in the java encoded input stream in order to provide a similar functionality as that of the CDR encoded input stream. However, the underlying java.io.ObjectInputStream object does not support mark and reset operations. At the level of the java.io.ObjectInputStream object, the semantics of mark and reset operations are undefined. However, mark and reset operations have specific semantics at the java encoded input stream level, and the type boundaries are well defined. This embodiment of the Java serialization mechanism takes advantage of that.

One embodiment may pool Java serialization implementation objects to improve performance. For example, Java serialization implementation objects that perform the actual Java serialization and deserialization of data from network messages may be pooled and reused. This embodiment may avoid the creation of new Java serialization implementation objects each time a network message is handled by pooling and reusing the implementation objects. In order to pool such Java serialization implementation objects, the object streams may not be closed; instead their state may be reset.

In one embodiment, a FIFO Queue data structure is used to support mark and reset semantics. The state machine is as follows:

| | MARK ON | QUEUE EMPTY | ACTION |
|---|---|---|---|
| 1: | No | Yes | Read from Stream |
| 2: | No | No | Read from Queue + dequeue |
| 3: | Yes | Yes \|\| No | Read from Stream + enqueue |
| 4: | Yes | No && (peekIndex < peekCount) | Read from Queue + peekIndex++ |

Case (4) is a special case of case (3) that occurs when a mark-reset is followed by another mark-reset before all the queued data items are dequeued. That is, when the second mark operation begins, the queue is not empty. In this case, read operations within the second mark-reset duration read from the queue linearly, but do not dequeue the read items until the last element in the queue is read. This is important since only read operation outside the mark-reset zone can dequeue items in the queue. After the last element is read, further read operations within the second mark will read from the stream (case 3).

Case (4) is supported using peekCount and peekIndex variables. These variables are set when mark( ) is called, and if the queue is not empty. These variables are unset during reset( ). A regular read operation after a mark and reset duration may get a java.lang.ClassCastException, if the expected operand type does not match the previously read queued operand type.

FIGS. 2 through 10 illustrate means for a server to support Java serialization encoding for marshaled data in RMI-IIOP message exchanges, means for the server to publish an indication that the server supports Java serialization encoding for marshaled data in RMI-IIOP message exchanges, and means for clients to invoke objects on a server that supports Java serialization encoding for marshaled data in RMI-IIOP message exchanges. FIGS. 2 through 10 further illustrate means for a server to support two or more alternative encoding types, including, but not limited to, Java serialization encoding and CDR encoding, in RMI-IIOP message exchanges, and means for indicating which of two or more alternative encoding types is used in RMI-IIOP message exchanges.

Figure 2:
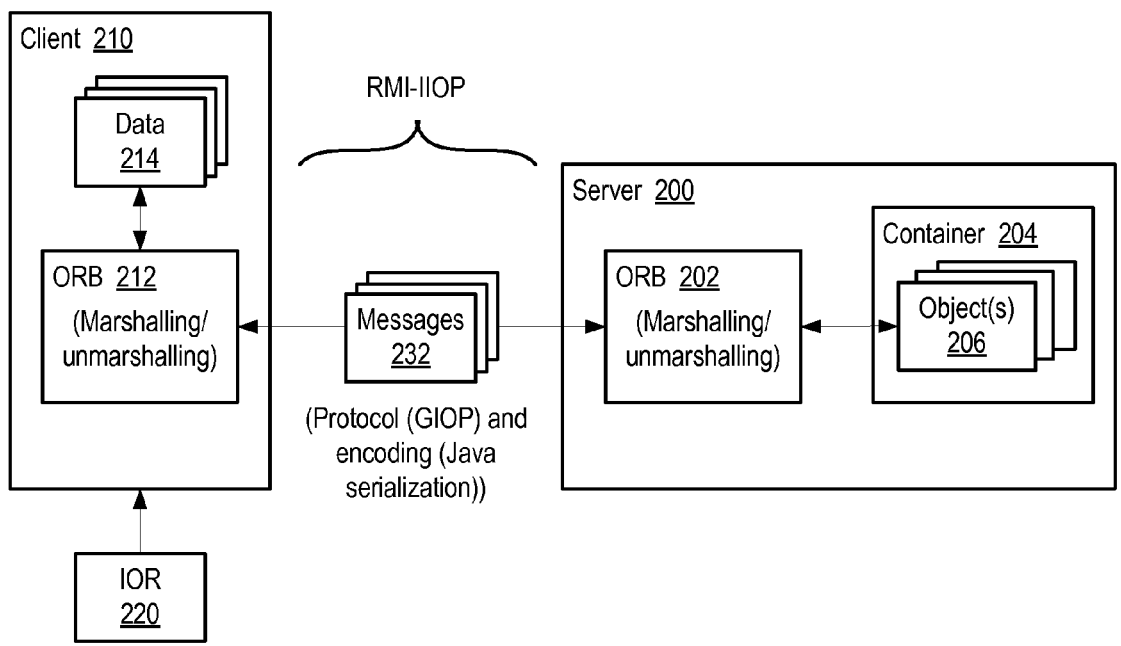
FIG. 2 illustrates an RMI-IIOP implementation that uses Java serialization as a data encoding format, according to one embodiment.

FIG. 2 illustrates an RMI-IIOP implementation that uses Java serialization as a data encoding format, according to one embodiment. CDR encoding may have overheads that may be avoided by using Java serialization as an alternative encoding format for data in RMI-IIOP messages. Embodiments may replace CDR encoding in RMI-IIOP messages with Java serialization, or alternatively allow the selection of Java serialization or CDR as alternative data encoding formats for RMI-IIOP message exchanges.

In FIG. 2, a CORBA client 210 uses RMI-IIOP through client-side ORB 212 and server-side ORB 202 on server 200 to access object(s) 206 on server 200. Server 200 may be an application server instance on a server system; a server system may include one or more instances of an application server. Note that client 210 may itself be a server, or an application or object on another or the same server. Objects 106 may reside in one or more containers 204 on server 200. A container 204 is an entity that provides life cycle management, security, deployment, and runtime services to objects 206. An object 206 may be defined as an application-level software unit supported by a container 204. J2EE objects may include development and deployment units in the EJB tier and Web tier. Objects 206 may include one or more of, but are not limited to, EJBs (Enterprise JavaBeans), JSPs (JavaServer Pages) and Servlets. Containers 204 provide support for the objects 206, providing for reliable and standardized object-specific services. Various types of containers (e.g., EJB, Web, JSP (JavaServer Pages), Servlet, applet, and application client) may provide object-specific services.

Client 210 may desire or need to invoke an object 206 on a server 200. To invoke an object on a server, client 210 needs information about the object 206, such as where the object 206 is located. To obtain this information, client 210 may access a naming registry, for example a CORBA naming service, to obtain an object reference (IOR 220) for the object 206. In CORBA, an object reference may be referred to as an Interoperable Object Reference (IOR). An IOR 220 may, for example, be a stub to the associated object 206. An IOR 220 may include information for accessing the associated object 206. For example, an IOR 220 may include one or more of, but is not limited to, the host name, port name, and Quality of Service (QoS) information. An IOR 220 may also include other information, such as a tagged component that includes information indicating which encoding type(s) are supported (e.g., Java serialization and/or CDR), and version information for the encoding type(s).

After obtaining an IOR 220, the client 210 may make an invocation on the target object 206 on the server 200. When client 210 makes an invocation of an object 206 on the server 200, the client-side ORB 212 constructs a message 232 formatted in accordance with GIOP that may then be sent to the server 200 via RMI-IIOP. There are different types of messages 232 supported the GIOP protocol. The type of message 232 used is appropriate to the nature of the particular call being made. For invocation of an object 206, a request message may be used. Messages 232 may be constructed by the client-side ORB 212. To construct a message 232, data 214 appropriate to the message 232 may be marshaled into one or more message buffers. For example, a target object 206 to be invoked which is a method "FOO( )" may require one or more parameters, which may be of integer, Boolean, string, real, or any other data type. The parameters from the client side are marshaled into the message buffers so that they can be sent "over the wire" to the server 200 in a message 232.

In marshaling, an encoding mechanism may be used to marshal the client's in-memory data structure values, formatted in accordance with a data format used on client 210, into the message buffer(s). In this embodiment, a mechanism may be provided to marshal the data 214 into the messages 232 using Java serialization. In one embodiment, this mechanism may use the Java Serialization API provided by the JDK to serialize the data 214. In one embodiment, client 210 may determine from the obtained IOR 220 that the server-side ORB 202 supports Java serialization, and the type(s) and version(s) of Java encoding that the server-side ORB 202 supports. The client 210 may include an indication as to what type (and version) of encoding is used in the messages 232. In one embodiment, this indication may be included in GIOP version information included in the messages 232. The messages 232 may then be sent "over the wire" to the server 200, where the server-side ORB 202 may unmarshal the Java serialization-encoded data from the messages into a data format used by the object 206 being invoked on server 200, which may or may not be the same data format used on client 210. In one embodiment, server-side ORB 202 may determine what encoding is used for the data in the message(s) 232A from the GIOP version information in the message(s).

An invoked object 206 on server 200 may generate one or more response messages to client 210. In sending response messages, server-side ORB 202 may marshal data formatted in accordance with a data format used by the invoked object 206 using Java serialization. Server-side ORB 202 may include an indication as to what type (and version) of encoding is used in the response messages. In one embodiment, this indication may be included in GIOP version information in the messages. Client-side ORB 212 may unmarshal the Java serialization-encoded data from received response messages into a data format used on client 210, determining the encoding type (and version) that was used from the indication in the response messages.

Note that both the client-side ORB 212 and server-side ORB 202 need to support Java serialization for Java serialization to be used as the data encoding format for RMI-IIOP messages between the ORBs. Thus, embodiments may allow the selection of Java serialization or CDR as the data encoding format for RMI-IIOP messages to support ORBs that do and ORBs that do not support Java serialization.

Figure 3:
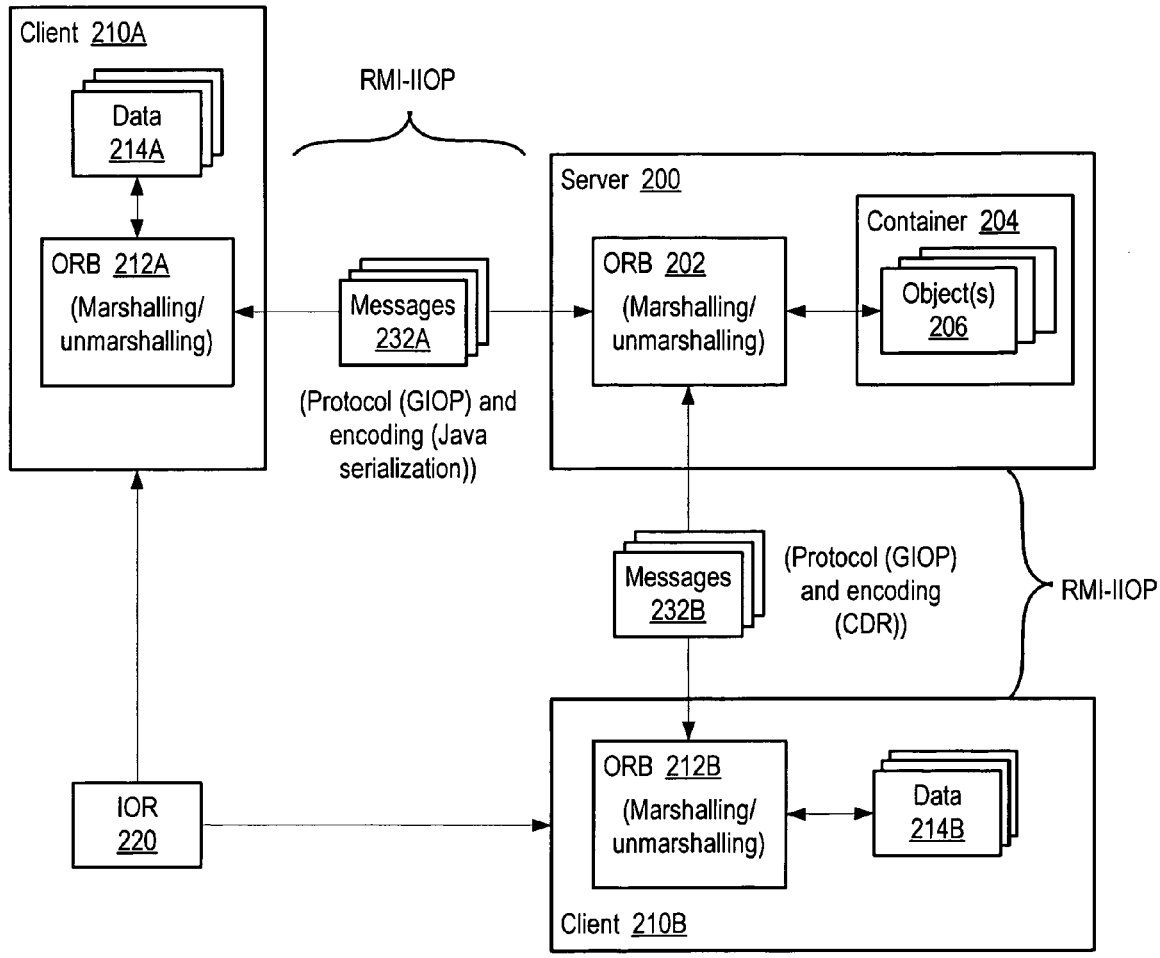
FIG. 3 illustrates an RMI-IIOP implementation that uses Java serialization as the data encoding format for messages between a server and one client and CDR as the data encoding format for messages between the server and another client, according to one embodiment.

FIG. 3 illustrates an RMI-IIOP implementation that uses Java serialization as the data encoding format for messages between a server and one client and CDR as the data encoding format for messages between the server and another client, according to one embodiment. In FIG. 3, CORBA clients 210A and 210B may use RMI-IIOP through client-side ORBs 212A and 212B, respectively, to access object(s) 206 on server 200 via server-side ORB 202. To invoke an object on server 200, clients 210 may obtain an object reference (IOR 220) for the object 206, for example from a CORBA naming service. An IOR 220 may include information for accessing an associated object 206. For example, an IOR 220 may include one or more of, but is not limited to, the host name, port name, and Quality of Service (QoS) information. An IOR 220 may also include other information, such as a tagged component that includes information indicating which encoding type(s) are supported (e.g., Java serialization and/or CDR), and version information for the encoding type(s).

After obtaining an IOR 220, a client 210 may make an invocation on the target object 206 on server 200. When a client 210 makes an invocation of an object 206 on server 200, the client-side ORB 212 constructs a message 232 formatted in accordance with GIOP that may then be sent to the server 200 via RMI-IIOP. To construct a message 232, data 214 appropriate to the message 232 may be marshaled into one or more message buffers to be sent "over the wire" to the server 200 in the message 232.

In marshaling, an encoding mechanism may be used to marshal the client's in-memory data structure values, formatted in accordance with a data format used on the particular client 210, into the message buffer(s). In this embodiment, ORB 212A on client 210A may include a mechanism to marshal data 214A into messages 232A using Java serialization. In one embodiment, client 210A may determine from the obtained IOR 220 that the server-side ORB 202 supports Java serialization, and the type(s) and version(s) of Java encoding that the that the server-side ORB 202 supports. The client 210A may include an indication as to what type (and version) of encoding is used in the messages 232A. In one embodiment, this indication may be included in GIOP version information included in the messages 232A. The messages 232A may then be sent "over the wire" to the server 200, where the server-side ORB 202 may unmarshal the Java serialization-encoded data from the messages into a data format used by the object 206 being invoked on server 200, which may or may not be the same data format used on client 210A. In one embodiment, server-side ORB 202 may determine what encoding is used for the data in the message(s) 232A from the GIOP version information in the message(s). ORB 212B on client 210B may include a mechanism to marshal data 214B into messages 232B using CDR. The messages 232B may then be sent "over the wire" to the server 200, where the server-side ORB 202 may unmarshal the CDR-encoded data from the messages into a data format used by the object 206 being invoked on server 200, which may or may not be the same data format used on client 210B. In one embodiment, server-side ORB 202 may determine what encoding is used for the data in the message(s) 232B from the GIOP version information in the message(s).

An invoked object 206 on server 200 may generate one or more response messages to the clients 210 in response to request messages 232. In sending response messages to client 210A, server-side ORB 202 may marshal data formatted in accordance with a data format used by the invoked object 206 in accordance with Java serialization. Client-side ORB 212A may unmarshal the Java serialization-encoded data from received response messages into a data format used on client 210A. In sending response messages to client 210B, server-side ORB 202 may marshal data formatted in accordance with a data format used by the invoked object 206 using CDR. Client-side ORB 212B may unmarshal the CDR-encoded data from received response messages into a data format used on client 210B. Server-side ORB 202 may include an indication as to what type (and version) of encoding is used in the response messages. In one embodiment, this indication may be included in GIOP version information in the messages.

In one embodiment, information in the IOR 220 (e.g., in a tagged component in the IOR) may be used to specify which of two or more types of encoding (e.g., Java serializations or CDR) are supported by a server-side ORB 202 on the server that hosts the referenced object. This encoding information may be used by clients 212 to select an encoding from among the supported encodings to be used in RMI-IIOP messages to invoke the object referenced by the IOR 220 on the server. This encoding information may also be used by clients 212 to indicate which encoding is being used in RMI-IIOP messages 232 sent to the server 200. This enables RMI-IIOP requests to be made on the same IOR 220 to a server-side ORB 202 using different encodings from different client-side ORBs 212, or from a single client-side ORB 212. In one embodiment, a client 210 may switch between CDR and Java serialization as an encoding mechanism for RMI-IIOP messages 232 to an object reference in a server-side ORB 202 from one message to another.

Figure 4:
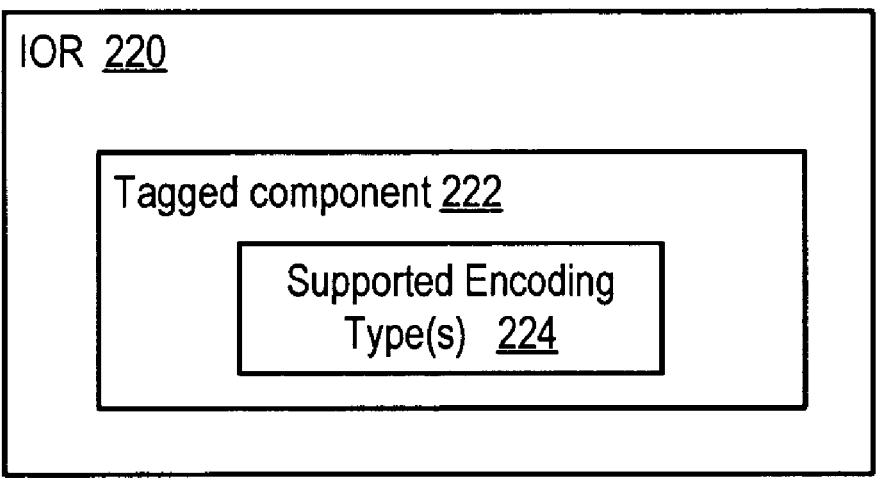
FIG. 4 illustrates an exemplary IOR that includes information indicating which type(s) of encoding are supported by a server-side ORB according to one embodiment.

FIG. 4 illustrates an exemplary IOR that includes information indicating which type(s) of encoding are supported by a server-side ORB according to one embodiment. In one embodiment, CORBA IOR 220 may include a tagged component 222 that includes information indicating the encoding type(s) 224 that the server-side ORB supports (e.g., Java serialization and CDR), and that may also indicate one or more versions of the encoding types that are supported. Note that other embodiments may use other mechanisms than a tagged component within the IOR 220 to indicate encoding type(s) by the IOR. The IOR 220 may be published by the server, for example in a naming service.

In one embodiment, when a client 210 acquires an IOR 220, for example from a naming service, if the IOR 220 includes a tagged component 222, the client 210 may determine from the supported encoding type information 224 in the tagged component 222 which encoding type(s) are supported by the server-side ORB 202 associated with the IOR 220, and also may determine what version of an encoding type (e.g., what version of Java encoding) is supported by the server-side ORB 202.

In one embodiment, to process Java encoding information included in the tagged component 222 of the published IOR 220 the client 210 reads the information from the tagged component 222, determines if the client's Java encoding version matches a Java encoding version supported by the server-side ORB as indicated in the tagged component, and then determines if Java encoding is to be used, if there is a match. Note that a server may support a number of versions of Java encoding for backwards compatibility, whereas clients may tend to be more specific as to which versions they support.

If the tagged component 222 indicates that the server-side ORB 202 supports Java serialization, and the client-side ORB 212 supports Java serialization, the client-side ORB 212 may use Java serialization for the encoding of data in RMI-IIOP messages 232 sent to the server-side ORB 202 to invoke the object 206 referenced by the IOR 220. Note that the client-side ORB 212 may not be required to use Java serialization if the IOR 220 indicates that the server-side ORB 202 supports Java serialization, and may optionally use either Java serialization or CDR for data encoding in RMI-IIOP messages to invoke the associated object 206 on the server 200. In one embodiment, GIOP version information within the RMI-IIOP messages may be used to indicate which encoding type is used to marshal data in the messages.

Upon receiving an RMI-IIOP request message from client 210, the server-side ORB 202 may use the GIOP version information in the message to determine what encoding type was used to marshal data into the message, for example if the data is encoded using Java serialization. The server 200 may then Unmarshal the data accordingly, and service the request. The server 200 may then use Java serialization to marshal response data in one or more response messages to the client 210. The server may also use GIOP version information within the response messages to indicate to the client-side ORB 212 that Java serialization was used for the response messages.

Figure 5:
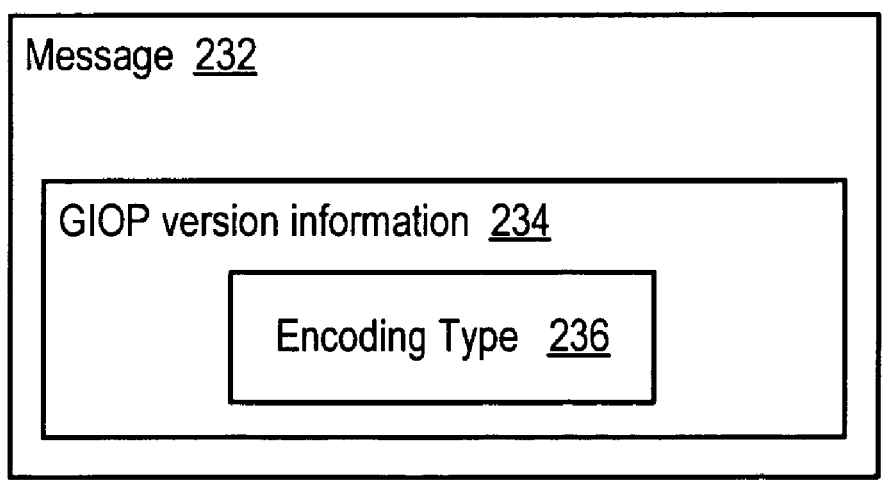
FIG. 5 illustrates an exemplary RMI-IIOP message that includes information indicating which type of encoding was used to marshal data into the message according to one embodiment.

FIG. 5 illustrates an exemplary RMI-IIOP message that includes information indicating which type of encoding was used to marshal data into the message according to one embodiment. In embodiments, when the client-side ORB 212 sends an RMI-IIOP message 232 to a server-side ORB 202, the client-side ORB 212 may include an indication in the message 232 as to which encoding type (e.g. Java serialization or CDR) was used for marshaling data 214 into the message 232. Similarly, the server-side ORB 202 may include an indication as to which encoding type was used for marshaling data into messages 232 send to the client-side ORB 212. An ORB that receives an RMI-IIOP message 232 may then use this information to determine how to unmarshal data from the message 232.

Each RMI-IIOP message 232 may include a field or fields that include GIOP version information 234, such as the GIOP major and minor version. In one embodiment, the GIOP version information 234 may include, or may be used to indicate, the encoding type 236 used to marshal data into the RMI-IIOP message 232. In one embodiment, at least a part of GIOP version information 234 that is otherwise unused may be used to indicate which encoding type was used in the message 232. In one embodiment, the GIOP version information 234 may indicate a GIOP major and minor version, and the GIOP major and minor version may be set to a value that indicates which encoding type was used in the message 232. In other embodiments, another field or fields in the message 232 may be used to indicate the encoding type used.

Note that the information in an IOR 220 may indicate two or more different encoding types supported, while the information in a message indicates a particular encoding type used for the message 232. In embodiments, the specific information included in an IOR 220 to indicate encoding types (e.g., Java serialization and CDR) supported by the server-side ORB 202 may be different than the specific information included in a message 232 to indicate the encoding type used to marshal data into the message.

For example, an IOR 220 may include an 8-bit field used to indicate supported encoding types. In binary, a value of 00000001 may be used to indicate that a server-side ORB 202 supports only CDR, and a value of 00000010 may be used to indicate that a server-side ORB 202 supports CDR and Java serialization. In RMI-IIOP messages 232 sent by a client-side ORB 212 to a server-side ORB 202 that supports both encoding types as indicated by a value of 00000010 in the IOR 220, the value 00000001 may be used to indicate that CDR was used for marshaling data into the message, and 00000010 may be used to indicate that Java serialization was used. If an additional encoding type is supported, then a value of 00000011 may be used to indicate that the server-side ORB 202 supports CDR, Java serialization, and the additional encoding type. In RMI-IIOP messages 232 sent by a client-side ORB 212 to a server-side ORB 202 that supports three encoding types as indicated by a value of 00000011, the value 00000001 may be used to indicate that CDR was used for marshaling data into the message, 00000010 may be used to indicate that Java serialization was used, and 00000011 may be used to indicate that the third encoding type was used in the message. Note that the above mechanism for indicating supported encoding types in IORs and used encoding types in messages is exemplary and is not intended to be limiting. Other mechanisms for indicating supported encoding types in IORs and other mechanisms for indicating encoding types used for marshaling data into messages may be used.

By using a tagged component within the IOR to indicate which encoding types are supported by the server-side ORB and the GIOP version information within RMI-IIOP messages to indicate which encoding type was used to marshal data into the messages, both Java serialization and CDR encoding may be supported, and other encodings than Java serialization and CDR may be supported while remaining backwards-compatible with older versions.

Figure 6:
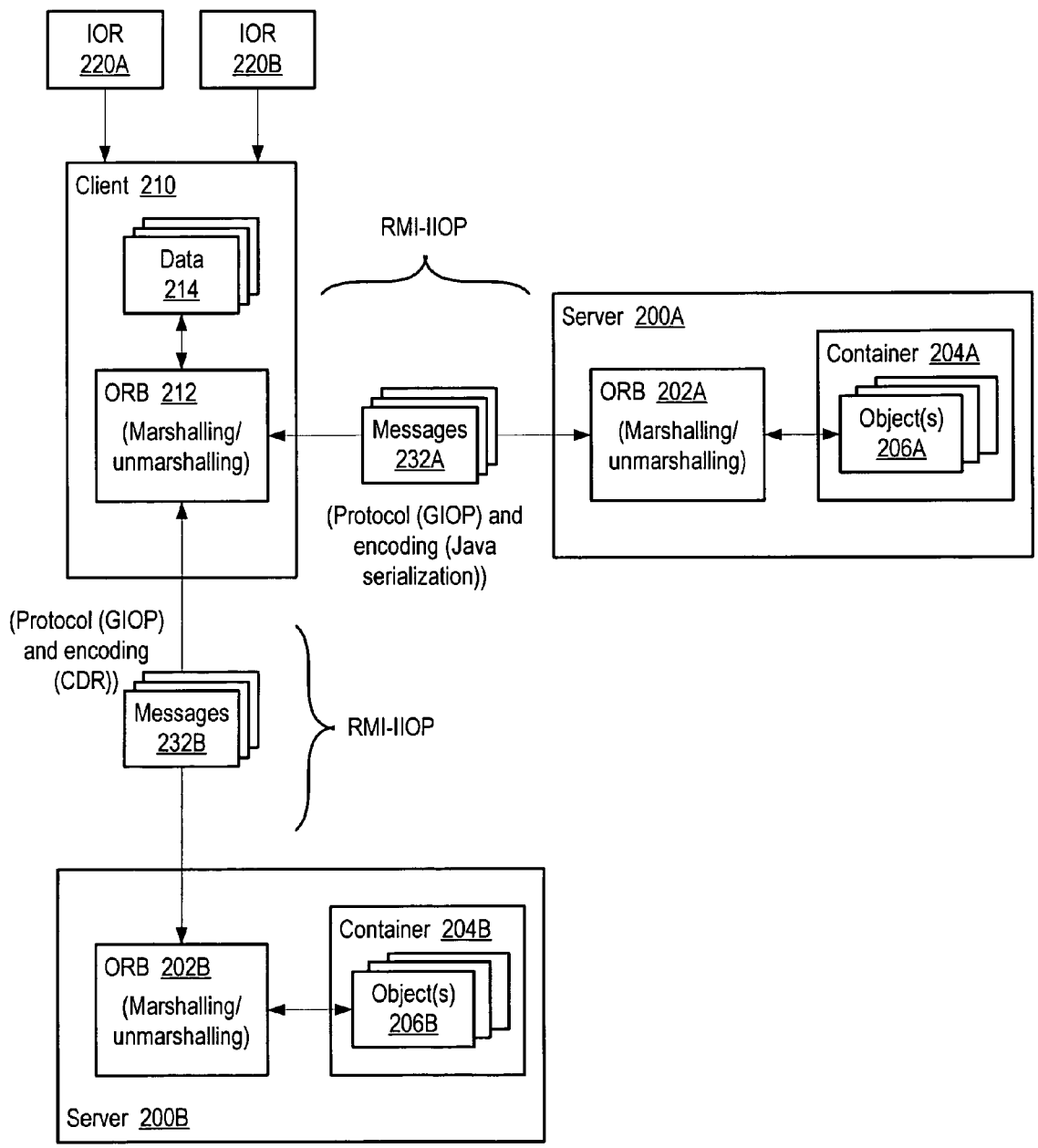
FIG. 6 illustrates an exemplary client using different encoding types to communicate to different servers using RMI-IIOP according to one embodiment.

FIG. 6 illustrates an exemplary client using different encoding types to communicate to different servers using RMI-IIOP according to one embodiment. In FIG. 6, CORBA client 210 may use RMI-IIOP through client-side ORB 212 to access object(s) 206A on server 200A via server-side ORB 202A and object(s) 206B on server 200B via server-side ORB 202B. To invoke an object on server 200A, client 210 may obtain an object reference (IOR 220A) for the object 206A. To invoke an object on server 200B, client 210 may obtain an object reference (IOR 220B) for the object 206B.

After obtaining an IOR 220, client 210 may make an invocation on the target object 206 on the associated server 200. When client 210 makes an invocation of an object 206 on a server 200, the client-side ORB 212 constructs a message 232 formatted in accordance with GIOP that may then be sent to the associated server 200 via RMI-IIOP. To construct a message 232, data 214 appropriate to the message 232 may be marshaled into one or more message buffers to be sent "over the wire" to the server 200 in the message 232. In marshaling, an encoding mechanism may be used to marshal the client's in-memory data structure values, formatted in accordance with a data format used on the client 210, into the message buffer(s). In this embodiment, ORB 212 on client 210 may include a mechanism to marshal data 214 into messages 232 using Java serialization or CDR. The messages 232 may then be sent "over the wire" to the server 200 that hosts the target object 206, where the server-side ORB 202 may unmarshal the data from the messages into a data format used by the object 206 being invoked on the server 200.

In this example, server-side ORB 202A on server 200A may support Java serialization for data marshaled into RMI-IIOP messages 232A. IOR 220A may include an indication that server-side ORB 202A supports Java serialization, for example in a tagged component. When sending RMI-IIOP messages 232A to server 200A, client 210 may optionally use Java serialization as the encoding type when marshaling data 214 into the messages. Server-side ORB 202B on server 200B may not support Java serialization for data marshaled into RMI-IIOP messages 232B, and thus IOR 220B may not indicate that server-side ORB 202B supports Java serialization. In one embodiment, IOR 220B may not include a tagged component for indicating encoding types supported by the IOR, and the absence of this tagged component may indicate to the client that the server-side ORB 202B does not support Java serialization. Alternatively, IOR 220B may include such a tagged component, and the tagged component may indicate that the server-side ORB 202B does not, or not indicate that it does, support Java serialization. When sending RMI-IIOP messages 232B to server 200B, client 210 may use CDR as the encoding type when marshaling data 214 into the messages. Note that, alternatively, server-side ORB 202B may support both CDR and Java serialization, and client 210 may optionally used CDR as the encoding format. In one embodiment, client 210 may use GIOP version information in request messages sent to the server(s) 200 to indicate what encoding type is used in the message(s), as previously described.

An invoked object 206 on a server 200 may generate one or more response messages to client 210 in response to messages 232. In sending response messages to client 210, server-side ORB 202A may marshal data formatted in accordance with a data format used by the invoked object 206A using Java serialization. Client-side ORB 212 may unmarshal the Java serialization-encoded data from received response messages into a data format used on client 210. Note that server-side ORB 202A may optionally marshal data into the response messages using CDR. In one embodiment, server-side ORB 202A may use GIOP version information in the response messages sent to the client 210 to indicate what encoding type is used in the response message(s), as previously described.

In sending response messages to client 210, server-side ORB 202B may marshal data formatted in accordance with a data format used by the invoked object 206B using CDR. Client-side ORB 212 may unmarshal the CDR-encoded data from received response messages into a data format used on client 210. Note that, if server-side ORB 202B supports both Java serialization and CDR, server-side ORB 202B may optionally marshal data into the response messages using Java serialization, and may use GIOP version information in the response messages sent to the client 210 to indicate what encoding type is used in the response message(s), as previously described.

Figure 7:
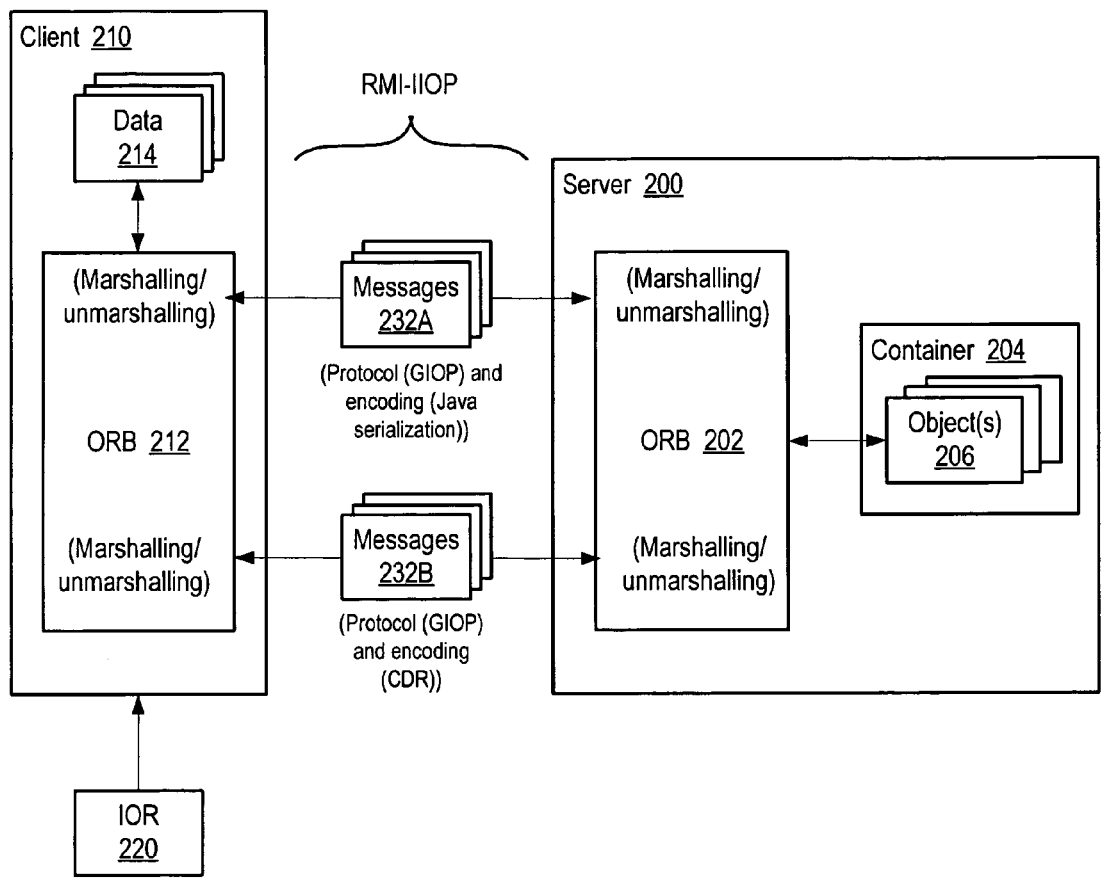
FIG. 7 illustrates an exemplary client using different encoding types to communicate to a server using RMI-IIOP according to one embodiment.

FIG. 7 illustrates an exemplary client using different encoding types to communicate to a server using RMI-IIOP according to one embodiment. In FIG. 7, CORBA client 210 may use RMI-IIOP through client-side ORB 212 to access object(s) 206 on server 200 via server-side ORB 202. To invoke an object on server 200, client 210 may obtain an object reference (IOR 220) for the object 206. After obtaining IOR 220, client 210 may make an invocation on the target object 206 on the server 200. When client 210 makes an invocation of an object 206 on server 200, the client-side ORB 212 constructs a message 232 formatted in accordance with a GIOP that may then be sent to the server 200 via RMI-IIOP. To construct a message 232, data 214 appropriate to the message 232 may be marshaled into one or more message buffers to be sent "over the wire" to the server 200 in the message 232. In marshaling, an encoding mechanism may be used to marshal the client's in-memory data structure values, formatted in accordance with a data format used on the client 210, into the message buffer(s). The messages 232 may then be sent "over the wire" to the server 200 that hosts the target object 206, where the server-side ORB 202 may unmarshal the data from the messages into a data format used by the object 206 being invoked on the server 200.

In this example, client-side ORB 212 on client 210 may support both Java serialization and CDR for marshaling data into RMI-IIOP messages 232, and server-side ORB 202 on server 200 may support both CDR and Java serialization for data marshaled into RMI-IIOP messages 232. IOR 220 may include an indication that server-side ORB 202 supports Java serialization and CDR, for example in a tagged component. Client 210 may access this indication in the IOR 220 to determine what encoding type(s) the server-side ORB 202 supports. When sending RMI-IIOP messages 232 to server 200A, client 210 may optionally use Java serialization or CDR as the encoding type when marshaling data 214 into the messages. In this example, messages 232A are encoded using Java serialization, and messages 232B using CDR. In one embodiment, client 210 may use GIOP version information in the messages 232 sent to the server(s) 200 to indicate what encoding type is used in the particular message(s), as previously described.

An invoked object 206 on server 200 may generate one or more response messages to the client 210 in response to messages 232. In sending response messages to client 210, server-side ORB 202 may marshal data formatted in accordance with a data format used by the invoked object 206 using Java serialization or CDR. Client-side ORB 212 may unmarshal the encoded data from received response messages into a data format used on client 210. In one embodiment, server-side ORB 202 may use GIOP version information in the response messages sent to the client 210 to indicate what encoding type is used in the response message(s), as previously described.

Figure 8:
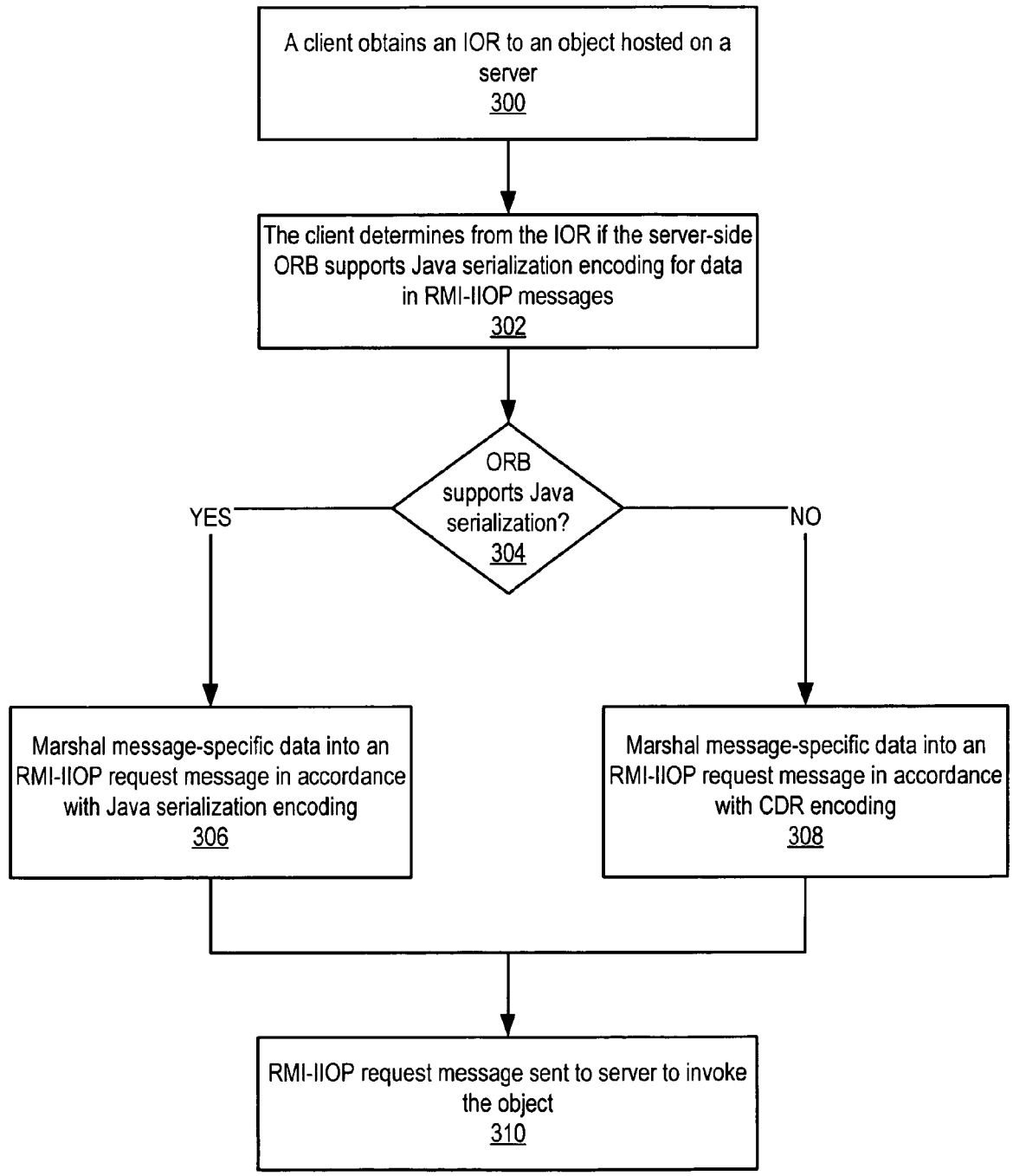
FIGS. 8 and 9 are flowcharts of a method for the remote invocation of objects using Java serialization as an encoding type for data marshaled into RMI-IIOP messages according to one embodiment.
Figure 9:
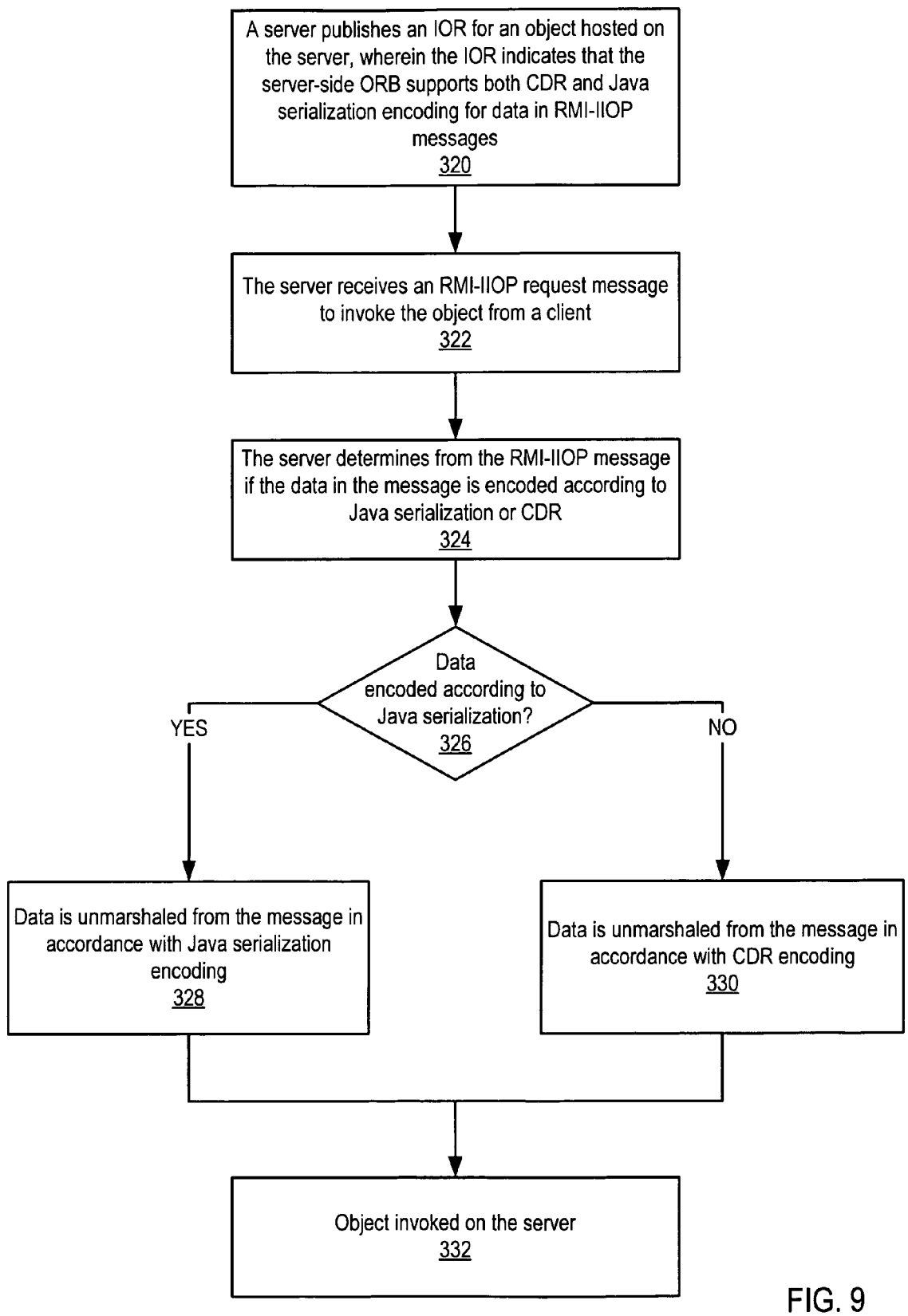

FIGS. 8 and 9 are flowcharts of a method for the remote invocation of objects using Java serialization as an encoding type for data marshaled into RMI-IIOP messages according to one embodiment. FIG. 8 illustrates the remote invocation of objects using Java serialization from the client side, and FIG. 9 from the server side. Note that, in one embodiment, both the client-side ORB and the server-side ORB must support Java serialization for Java serialization to be used in RMI-IIOP message exchanges between the client and server.

In FIG. 8, as indicated at 300, a client obtains an IOR to an object hosted on a server. The client may access a naming registry, for example a CORBA naming service, to obtain the IOR to the object, or alternatively may obtain the IOR from some other source. The IOR may include information for accessing the associated object. For example, an IOR may include one or more of, but is not limited to, the host name, port name, and Quality of Service (QoS) information. An IOR may also include other information, such as versioning information for GIOP.

In one embodiment, the IOR may include information indicating which encoding type(s) (e.g., Java serialization and/or CDR) are supported for data marshaled into RMI-IIOP messages by the server-side ORB. This information may also indicate versions of the encoding type(s) supported. In one embodiment, this information on encoding types may be in a tagged component of the IOR. Note that other embodiments may use other mechanisms to indicate supported encoding type(s). In one embodiment, the IOR may indicate that the server-side ORB supports both CDR encoding and Java serialization encoding for data in RMI-IIOP message exchanges. Note that an IOR may also indicate that the server-side ORB supports either Java serialization or CDR encoding, or in some embodiments some other encoding than or in addition to Java serialization and CDR.

As indicated at 302, the client may determine from the information in the IOR if the server-side ORB on the server that hosts the object supports Java serialization encoding for data in RMI-IIOP messages. At 304, if the client determines from the information in the IOR that the server-side ORB supports Java serialization in RMI-IIOP message exchanges, the client may marshal message-specific data into an RMI-IIOP request message in accordance with Java serialization encoding, as indicated at 306. Note that, if the IOR indicates that the server-side ORB supports one or more other encoding types in addition to Java serialization encoding, such as CDR, for RMI-IIOP message exchanges, the client may alternatively use one of the other encoding types, such as CDR, when marshaling data into the RMI-IIOP message. In one embodiment, if there are two or more encoding types supported by the server-side ORB, the client may programmatically select one of the encoding types to use when marshaling data into particular RMI-IIOP messages for the server-side ORB. In one embodiment, the client may include information in the RMI-IIOP request message indicating which encoding type was used to marshal data into the RMI-IIOP request message. In one embodiment, GIOP version information in the request message may be used to indicate which encoding (e.g., Java serialization or CDR) was used to marshal data into the request message. The RMI-IIOP request message may then be sent to the server to invoke the object, as indicated at 310.

At 304, if the client determines from the information in the IOR that the server-side ORB does not support Java serialization in RMI-IIOP message exchanges, the client may marshal message-specific data into an RMI-IIOP request message in accordance with CDR encoding, as indicated at 308. The RMI-IIOP request message may then be sent to the server to invoke the object, as indicated at 310. Note that the data may optionally be marshaled into the request message in accordance with CDR encoding if the server-side ORB does support Java serialization.

In FIG. 9, a server may publish an IOR for an object hosted on the server, as indicated at 320. The IOR may be published, for example, through a naming registry, for example a CORBA naming service. The IOR may include information for accessing the associated object. For example, an IOR may include one or more of, but is not limited to, the host name, port name, and Quality of Service (QoS) information. An IOR may also include other information, such as versioning information for GIOP.

In one embodiment, the IOR may include information indicating which encoding type(s) (e.g., Java serialization and/or CDR) are supported for data marshaled into RMI-IIOP messages by the server-side ORB. This information may also indicate versions of the encoding type(s) supported. In one embodiment, this information on encoding types may be in a tagged component of the IOR. Note that other embodiments may use other mechanisms to indicate supported encoding type(s). In one embodiment, the IOR may indicate that the server-side ORB supports both CDR encoding and Java serialization encoding for data in RMI-IIOP message exchanges.

After publishing the IOR, the server may receive an RMI-IIOP request message to invoke the object from a client that has obtained the published IOR, as indicated at 322. As indicated at 324, the server may determine from the RMI-IIOP request message the encoding type used to marshal data into the message, for example if the marshaled data in the message is encoded in accordance with Java serialization or CDR. In one embodiment, the client may include information in the RMI-IIOP request message indicating which encoding type (e.g., Java serialization or CDR) was used to marshal data into the request message. An exemplary mechanism for indicating the encoding type of marshaled data in an RMI-IIOP message is illustrated in FIG. 5.

At 326, if the server determines from the information in the RMI-IIOP request message that Java serialization was used to marshal data into the RMI-IIOP request message, then the server may unmarshal the data from the message in accordance with Java serialization encoding as indicated at 328. The object may then be invoked on the server, as indicated at 332. Note that the invoked object may generate one or more messages to the client in response to the RMI-IIOP request message. In one embodiment, in sending the RMI-IIOP response messages to the client, the server may marshal response data into the message using Java serialization or, alternatively, CDR. The client, after receiving the RMI-IIOP response messages, may unmarshal the data from the response messages according to the particular encoding type used for the data in the response message(s).

At 326, if the server determines from the information in the RMI-IIOP request message that CDR was used to marshal data into the RMI-IIOP request message, then the server may unmarshal the data from the message in accordance with CDR encoding as indicated at 330. The object may then be invoked on the server, as indicated at 332. If there are response message(s) for the client, the server may marshal data into the RMI-IIOP response messages using CDR. The client, after receiving the RMI-IIOP response messages, may unmarshal the CDR-encoded data from the response messages into a data format used on the client.

In one embodiment, the server may include information in the RMI-IIOP response message(s) indicating which encoding type (e.g., Java serialization or CDR) was used to marshal data into the response message. An exemplary mechanism for indicating the encoding type of marshaled data in an RMI-IIOP message is illustrated in FIG. 5.

Figure 10:
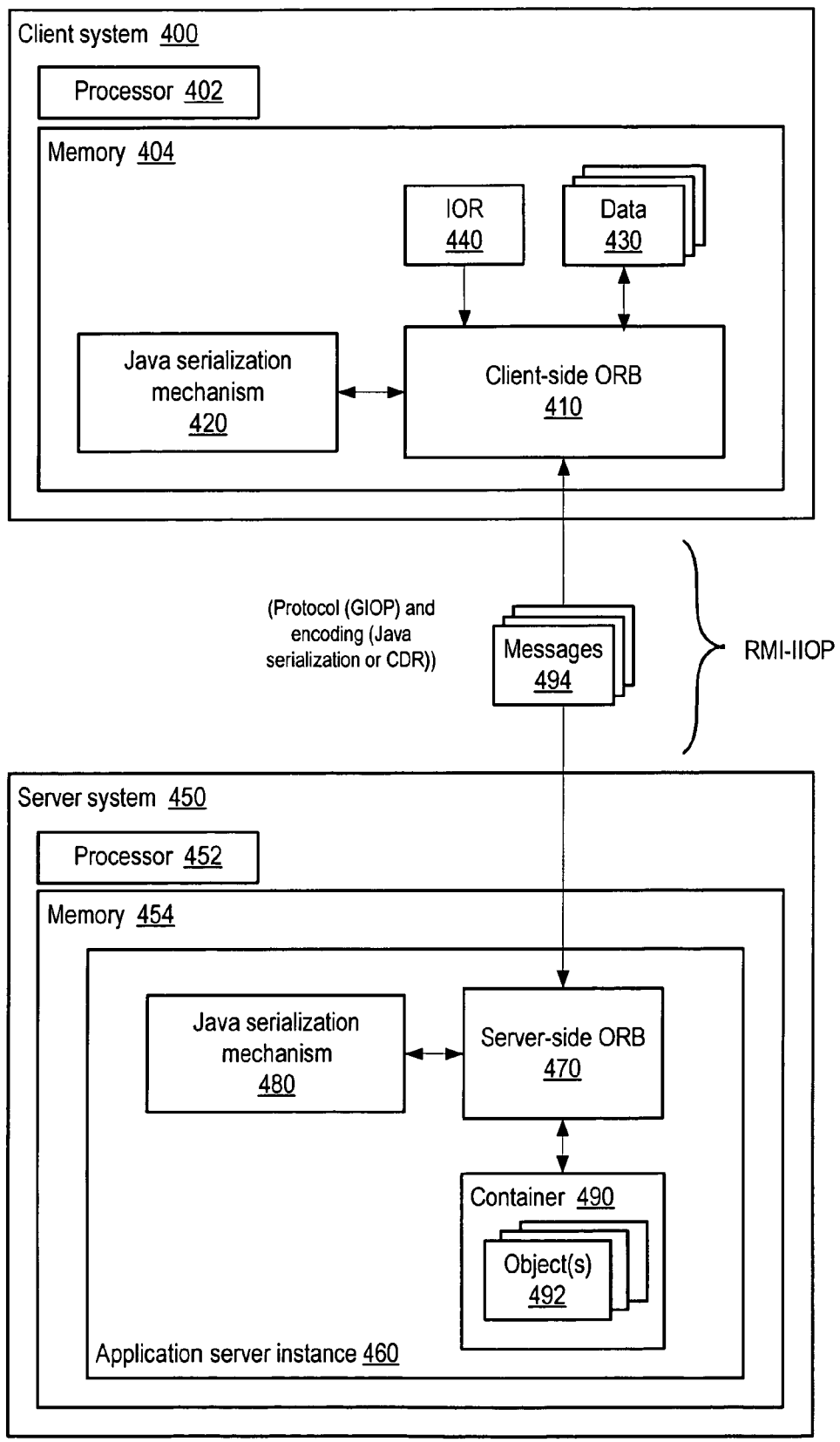
FIG. 10 illustrates a client system and a server system implementing RMI-IIOP using Java serialization as a data encoding mechanism according to one embodiment.

FIG. 10 illustrates a client system and a server system implementing RMI-IIOP using Java serialization as a data encoding mechanism according to one embodiment. Client system 400 may be any of various types of devices, including, but not limited to, a personal computer system, desktop computer, laptop or notebook computer, mainframe computer system, workstation, network computer, Portable Digital Assistant (PDA), smartphone, or other suitable device. Client system 400 may include at least one processor 402. The processor 402 may be coupled to a memory 404. Memory 404 is representative of various types of possible memory media, also referred to as "computer readable media" or "computer-accessible media." Hard disk storage, floppy disk storage, removable disk storage, flash memory and random access memory (RAM) are examples of memory media. The terms "memory" and "memory medium" may include an installation medium, e.g., a CD-ROM or floppy disk, a computer system memory such as DRAM, SRAM, EDO RAM, SDRAM, DDR SDRAM, Rambus RAM, etc., or a non-volatile memory such as a magnetic media, e.g., a hard drive or optical storage. The memory medium may include other types of memory as well, or combinations thereof.

Client system 400 may couple over a network, via wired or wireless network connections, to one or more server systems, such as server system 450, each hosting one or more application server instances 460. Client system 400 may communicate with application server instance 460 on server system 450 to invoke objects 492 hosted on the server instance 460 using RMI-IIOP. The network may be, for example, a Local Area Network (LAN), a Wide Area Network (WAN), a Storage Area Network (SAN), a LAN with Network-Attached Storage (NAS), or any network capable of coupling client systems to server systems. Server system 450 may be any of various types of devices including, but not limited to, workstations, server computers, personal computer systems, desktop computers, laptop or notebook computers, mainframe computer systems, workstations, network computers, or any device suitable for hosting an application server instance 460. In one embodiment, the operating system platforms supported by server system 450 may include one or more of, but are not limited to: Solaris SPARC 8 and 9 and Red Hat Linux 7.3 and 8. Note that other operating systems and versions of operating systems may be supported in some embodiments. Server system 450 may include at least one processor 452. The processor 452 may be coupled to a memory 454. Memory 454 is representative of various types of possible memory media, also referred to as "computer readable media" or "computer-accessible media." Hard disk storage, floppy disk storage, removable disk storage, flash memory and random access memory (RAM) are examples of memory media. The terms "memory" and "memory medium" may include an installation medium, e.g., a CD-ROM or floppy disk, a computer system memory such as DRAM, SRAM, EDO RAM, SDRAM, DDR SDRAM, Rambus RAM, etc., or a non-volatile memory such as a magnetic media, e.g., a hard drive or optical storage. The memory medium may include other types of memory as well, or combinations thereof.

Client system 400 may include, in memory 404, a client-side ORB 410 and Java serialization mechanism 420 as described herein. Server system 450 may include, in memory, one or more application server instances 460. Application server instance 460 may each include a server-side ORB 470 and a Java serialization mechanism 480 as described herein, and one or more objects 480, e.g. EJBs or Name Services, in one or more containers 490.

Application server instance 460 may generate IORs 440 for clients of the application server instance 460 for invoking objects 480 on the application server instance 460. An application, object, or other entity on client system 400 may obtain IORs 440, for example from a CORBA naming service for objects 480 on application server instance 460 it desires to invoke. An IOR may include information indicating that server-side ORB 470 supports Java serialization for marshaling data in RMI-IIOP messages 494, for example in a tagged component. To invoke a particular object 492 on application server instance 460, client system 400 may obtain an object reference (IOR 440) for the object 492. When client system 400 makes an invocation of an object 492 on application server instance 460, the client-side ORB 410 constructs a message 494 formatted in accordance with GIOP that may then be sent to the application server instance 460 via RMI-IIOP. To construct a message 494, data 430 appropriate to the message 394 may be marshaled into one or more message buffers to be sent "over the wire" to the on application server instance 360 in the message 394. In marshaling, Java serialization mechanism 320 may be used to marshal the client's in-memory data structure values, formatted in accordance with a data format used on the client system 300, into the message buffer(s), encoded in accordance with Java serialization, if support for Java serialization is indicated in the obtained IOR. The message 394, which may include an indication as to what encoding type was used for marshaling data into the message, may then be sent "over the wire" to the application server instance 360 that hosts the target object 392, where the server-side ORB 370 may access Java serialization mechanism 380 to unmarshal the Java serialization-encoded data from the message into a data format used by the object 392 being invoked on the application server instance 360.

In one embodiment, client-side ORB 310 may support both Java serialization and CDR for marshaling data into RMI-IIOP messages, and server-side ORB 470 may support both CDR and Java serialization for data marshaled into RMI-IIOP messages. IOR 440 may include an indication that server-side ORB 470 supports Java serialization and CDR, for example in a tagged component. When sending RMI-IIOP messages 494 to server-side ORB 470 on application server instance 460, client-side ORB 410 may optionally use either Java serialization or CDR as the encoding type when marshaling data 430 into the RMI-IIOP messages 494. Each message 494 may include an indication as to what encoding type was used for marshaling data into the message.

An invoked object 492 on application server instance 460 may generate one or more response messages to RMI-IIOP messages received from client-side ORB 410. In sending response messages to client-side ORB 410, server-side ORB 470 may marshal data formatted in accordance with a data format used by the invoked object 492 using Java serialization or CDR. Each response message may include an indication as to what encoding type was used for marshaling data into the message. Client-side ORB 410 may unmarshal the encoded data from response messages received from server-side ORB 470 into a data format used on client system 400.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or CD-ROM, volatile or non-volatile media such as RAM (e.g. SDRAM, DDR, RDRAM, SRAM, etc.), ROM, etc. As well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   an application server configured to host one or more objects, wherein the application server comprises a server-side Object Request Broker (ORB) configured to:
      receive Remote Method Invocation-Internet Inter-ORB Protocol (RMI-IIOP) messages each including message-specific data encoded in accordance with Common Object Request Broker Architecture (CORBA) Common Data Representation (CDR) encoding; and
      receive RMI-IIOP messages each including message-specific data encoded in accordance with Java Serialization encoding;
      wherein the same server-side ORB is configured to concurrently handle both RMI-IIOP messages including message-specific data encoded in accordance with CORBA CDR encoding and RMI-IIOP messages including message-specific data encoded in accordance with Java Serialization encoding;
   an RMI-IIOP client of the application server comprising a client-side ORB, wherein the client-side ORB is configured to:
      marshal message-specific data formatted in accordance with a data format of the client into an RMI-IIOP request message in accordance with CDR encoding or Java serialization encoding; and
      send the RMI-IIOP request message to the application server via RMI-IIOP to invoke an object on the application server, wherein the RMI-IIOP request message indicates which encoding is used in the RMI-IIOP request message.

2. The system as recited in claim 1, wherein the server-side ORB is configured to:
   receive the RMI-IIOP request message from the client-side ORB;

unmarshal the marshaled message-specific data in the RMI-IIOP request message to generate message-specific data formatted in accordance with a data format of the application server; and invoke the object on the application server on behalf of the client.

3. The system as recited in claim 2, wherein the server-side ORB is further configured to, in response to the RMI-IIOP request message:

marshal message-specific data formatted in accordance with the data format of the application server into an RMI-IIOP response message in accordance with CDR encoding or Java serialization encoding; and send the RMI-IIOP response message to the client-side ORB via RMI-IIOP.

4. The system as recited in claim 1, wherein the RMI-IIOP client is configured to obtain a remote reference to the object on the application server, wherein the remote reference includes an indication that the application server supports Common Object Request Broker Architecture (CORBA) Common Data Representation (CDR) encoding and Java serialization encoding for data encoding in RMI-IIOP messages.

5. The system as recited in claim 1, wherein the client-side ORB is further configured to include in the RMI-IIOP request message an indication that the message-specific data is encoded in the RMI-IIOP request message in accordance with CDR encoding or in accordance with Java serialization encoding.

6. A system, comprising:
an application server configured to:
receive RMI-IIOP request messages including message-specific data encoded in accordance with Common Object Request Broker Architecture (CORBA) Common Data Representation (CDR) encoding; and
receive RMI-IIOP request messages including message-specific data encoded in accordance with Java Serialization encoding;
wherein each RMI-IIOP request message is configured to invoke one of one or more objects hosted on the application server; and
wherein the same server-side ORB is configured to concurrently handle both RMI-IIOP messages including message-specific data encoded in accordance with CORBA CDR encoding and RMI-IIOP messages including message-specific data encoded in accordance with Java Serialization encoding;
a Remote Method Invocation-Internet Inter-ORB Protocol (RMI-IIOP) client of the application server, wherein the client is configured to:
marshal message-specific data formatted in accordance with a data format of the client into an RMI-IIOP request message in accordance with Java serialization encoding; and
send the RMI-IIOP request message to the application server via RMI-IIOP to invoke an object on the application server, wherein the RMI-IIOP request message indicates that Java serialization encoding is used in the RMI-IIOP request message.

7. The system as recited in claim 6, wherein the application server is further configured to:
receive the RMI-IIOP request message from the client;
unmarshal the marshaled message-specific data in the RMI-IIOP request message to generate message-specific data formatted in accordance with a data format of the application server; and
invoke the object on the application server on behalf of the client.

8. The system as recited in claim 7, wherein the application server is further configured to, in response to the RMI-IIOP request message:
marshal message-specific data formatted in accordance with the data format of the application server into an RMI-IIOP response message in accordance with Java serialization encoding; and
send the RMI-IIOP response message to the client via RMI-IIOP.

9. A system, comprising:
a processor; and
a memory comprising program instructions, wherein the program instructions are executable by the processor to implement an Object Request Broker (ORB) configured to:
receive an incoming Remote Method Invocation-Internet Inter-ORB
Protocol (RMI-IIOP) message, wherein the received RMI-IIOP message includes message-specific data encoded in accordance with Common Object Request Broker Architecture (CORBA) Common Data Representation (CDR) encoding;
receive another incoming RMI-IIOP message, wherein the other received RMI-IIOP message includes message-specific data encoded in accordance with Java serialization encoding; and
unmarshal the marshaled message-specific data in each received RMI-IIOP message to generate message-specific data formatted in accordance with a data format of the system;
wherein the same ORB is configured to concurrently handle both RMI-IIOP messages including message-specific data encoded in accordance with CORBA CDR encoding and RMI-IIOP messages including message-specific data encoded in accordance with Java Serialization encoding.

10. The system as recited in claim 9, wherein the incoming RMI-IIOP messages are received from another ORB.

11. The system as recited in claim 9, wherein the incoming RMI-IIOP messages are received from two or more different ORBs.

12. The system as recited in claim 9, wherein the program instructions are further executable by the processor to implement an application server instance, wherein the ORB is a server-side ORB of the application server instance, and wherein the incoming RMI-IIOP messages are RMI-IIOP request messages received from one or more client-side ORBs on one or more clients of the application server instance and configured to invoke one or more objects hosted on the application server instance.

13. The system as recited in claim 9, wherein the program instructions are further executable by the processor to implement an RMI-IIOP client, wherein the ORB is a client-side ORB of the RMI-IIOP client, and wherein the incoming RMI-IIOP messages are RMI-IIOP response messages received from one or more server-side ORBs on one or more application server instances in response to RMI-IIOP request messages from the client-side ORB to invoke one or more objects hosted on the application server instances.

14. The system as recited in claim 9, wherein the ORB is further configured to:
marshal message-specific data formatted in accordance with the data format of the system into an outgoing RMI-IIOP message, wherein the message-specific data is marshaled into the outgoing RMI-IIOP message in accordance with CDR encoding;

marshal message-specific data formatted in accordance with the data format of the system into another outgoing RMI-IIOP message, wherein the message-specific data is marshaled into the other outgoing RMI-IIOP message in accordance with Java serialization encoding.

15. The system as recited in claim 14, wherein the ORB is further configured to send the outgoing RMI-IIOP messages to another ORB.

16. The system as recited in claim 14, wherein the ORB is further configured to send the outgoing RMI-IIOP messages to two or more different ORBs.

17. The system as recited in claim 14, wherein the program instructions are further executable by the processor to implement an RMI-IIOP client, wherein the ORB is a client-side ORB of the RMI-IIOP client, and wherein the outgoing RMI-IIOP messages are RMI-IIOP request messages configured to be sent to one or more server-side ORBs of one or more application server instances to invoke one or more objects hosted on the one or more application server instances.

18. The system as recited in claim 14, wherein the program instructions are further executable by the processor to implement an application server instance, wherein the ORB is a server-side ORB of the application server instance, and wherein the outgoing RMI-IIOP messages are RMI-IIOP response messages configured to be sent to one or more client-side ORBs on one or more clients of the application server instance in response to RMI-IIOP request messages received from the one or more client-side ORBs to invoke one or more objects hosted on the application server instance.

19. The system as recited in claim 9, wherein the program instructions are further executable by the processor to implement an RMI-IIOP client, wherein the ORB is a client-side ORB of the RMI-IIOP client, and wherein the incoming RMI-IIOP messages are RMI-IIOP response messages received from one or more server-side ORBs of one or more application server instances in response to invocations of one or more objects hosted on the one or more application server instances by the client-side ORB.

20. The system as recited in claim 9, wherein the program instructions are further executable by the processor to implement an application server instance, wherein the ORB is a server-side ORB of the application server instance, and wherein the incoming RMI-IIOP messages are RMI-IIOP request messages received from one or more client-side ORBs on one or more clients of the application server instance to invoke one or more objects hosted on the application server instance.

21. A system, comprising:
a processor; and
a memory comprising program instructions, wherein the program instructions are executable by the processor to implement an Object Request Broker (ORB) configured to:
marshal message-specific data formatted in accordance with the data format of the system into an outgoing Remote Method Invocation-Internet Inter-ORB Protocol (RMI-IIOP) message, wherein the message-specific data is marshaled into the outgoing RMI-IIOP message in accordance with Common Object Request Broker Architecture (CORBA) Common Data Representation (CDR) encoding; and
marshal message-specific data formatted in accordance with the data format of the system into another outgoing RMI-IIOP message, wherein the message-specific data is marshaled into the other outgoing RMI-IIOP message in accordance with Java serialization encoding;
wherein the same ORB is configured to concurrently handle both outgoing RMI-IIOP messages in accordance with CORBA CDR encoding and outgoing RMI-IIOP messages in accordance with Java serialization encoding.

22. The system as recited in claim 21, wherein the ORB is further configured to send the outgoing RMI-IIOP messages to another ORB, wherein the other ORB is configured to concurrently handle both RMI-IIOP messages including message-specific data encoded in accordance with CORBA CDR encoding and RMI-IIOP messages including message-specific data encoded in accordance with Java Serialization encoding.

23. The system as recited in claim 21, wherein the ORB is further configured to send the outgoing RMI-IIOP messages to two or more different ORBs.

24. The system as recited in claim 21, wherein the program instructions are further executable by the processor to implement an RMI-IIOP client, wherein the ORB is a client-side ORB of the RMI-IIOP client, and wherein the outgoing RMI-IIOP messages are RMI-IIOP request messages configured to be sent to one or more server-side ORBs of one or more application server instances to invoke one or more objects hosted on the one or more application server instances.

25. The system as recited in claim 21, wherein the program instructions are further executable by the processor to implement an application server instance, wherein the ORB is a server-side ORB of the application server instance, and wherein the outgoing RMI-IIOP messages are RMI-IIOP response messages configured to be sent to one or more client-side ORBs on one or more clients of the application server instance in response to RMI-IIOP request messages received from the one or more client-side ORBs to invoke one or more objects hosted on the application server instance.

26. A method, comprising:
a client-side Object Request Broker (ORB) on a Remote Method Invocation-Internet Inter-ORB Protocol (RMI-IIOP) client marshaling message-specific data formatted in accordance with a data format of the client into an RMI-IIOP request message in accordance with Common Object Request Broker Architecture (CORBA) Common Data Representation (CDR) encoding or Java serialization encoding, wherein the same client-side ORB is configured to concurrently handle both outgoing RMI-IIOP messages in accordance with CORBA CDR encoding and outgoing RMI-IIOP messages in accordance with Java serialization encoding;
sending the RMI-IIOP request message to an application server via RMI-IIOP to invoke an object on the application server;
including in the RMI-IIOP request message an indication that the message-specific data is encoded in the RMI-IIOP request message in accordance with CDR encoding or in accordance with Java serialization encoding;
a server-side ORB on the application server receiving the RMI-IIOP request message from the client-side ORB;
the server-side ORB unmarshaling the marshaled message-specific data in the RMI-IIOP request message to generate message-specific data formatted in accordance with a data format of the application server; and
invoking the object on the application server on behalf of the client;
wherein the same server-side ORB is configured to concurrently handle both RMI-IIOP messages including message-specific data encoded in accordance with CORBA CDR encoding and RMI-IIOP messages including message-specific data encoded in accordance with Java Serialization encoding.

27. The method as recited in claim 26, further comprising:
in response to the RMI-IIOP request message, the server-side ORB marshaling message-specific data formatted in accordance with the data format of the application server into an RMI-IIOP response message in accordance with CDR encoding or Java serialization encoding; and
sending the RMI-IIOP response message to the client-side ORB via RMI-IIOP.

28. The method as recited in claim 26, further comprising:
the client-side ORB receiving the RMI-IIOP response message from the server-side ORB; and
the client-side ORB unmarshaling the marshaled message-specific data in the RMI-IIOP request message to generate message-specific data formatted in accordance with the data format of the client.

29. A computer-readable storage medium storing program instructions, wherein the program instructions are computer-executable to implement a client-side Object Request Broker (ORB) on a Remote Method Invocation-Internet Inter-ORB Protocol (RMI-IIOP) client configured to:
marshal message-specific data formatted in accordance with a data format of the client into an RMI-IIOP request message in accordance with Common Object Request Broker Architecture (CORBA) Common Data Representation (CDR) encoding or Java serialization encoding;
send the RMI-IIOP request message to a server-side ORB on an application server via RMI-IIOP to invoke an object on the application server;
include in the RMI-IIOP request message an indication that the message-specific data is encoded in the RMI-IIOP request message in accordance with CDR encoding or in accordance with Java serialization encoding;
receive an RMI-IIOP response message from the server-side ORB; and
unmarshal marshaled message-specific data in the RMI-IIOP response message to generate message-specific data formatted in accordance with the data format of the client, wherein the message-specific response data in the RMI-IIOP response message is encoded in accordance with CDR encoding or Java serialization encoding;
wherein the same client-side ORB is configured to concurrently handle both outgoing RMI-IIOP messages in accordance with CORBA CDR encoding and outgoing RMI-IIOP messages in accordance with Java serialization encoding and to concurrently handle both RMI-IIOP response messages encoded in accordance with CDR encoding and RMI-IIOP response messages encoded in accordance with Java serialization encoding.

30. A computer-readable storage medium storing program instructions, wherein the program instructions are computer-executable to implement a server-side Object Request Broker (ORB) on an application server configured to:
receive a Remote Method Invocation-Internet Inter-ORB Protocol (RMI-IIOP) request message from a client-side ORB on an RMI-IIOP client, wherein the RMI-IIOP request message includes message-specific data encoded in accordance with Common Object Request Broker Architecture (CORBA) Common Data Representation (CDR) encoding or Java serialization encoding, wherein the RMI-IIOP request message further includes an indication of whether the message-specific data is encoded according CORBA CDR encoding or Java serialization encoding;
unmarshal the marshaled message-specific data in the RMI-IIOP request message to generate message-specific data formatted in accordance with a data format of the application server;
in response to the RMI-IIOP request message, marshal message-specific data formatted in accordance with the data format of the application server into an RMI-IIOP response message in accordance with CDR encoding or Java serialization encoding, according to the indication in the RMI-IIOP request message; and
send the RMI-IIOP response message to the client-side ORB via RMI-IIOP;
wherein the same server-side ORB is configured to concurrently handle both outgoing RMI-IIOP response messages in accordance with CORBA CDR encoding and outgoing RMI-IIOP response messages in accordance with Java serialization encoding and to concurrently handle both RMI-IIOP request messages encoded in accordance with CDR encoding and RMI-IIOP request messages encoded in accordance with Java serialization encoding.

\* \* \* \* \*